US011544097B2

United States Patent
Rugina et al.

(10) Patent No.: US 11,544,097 B2
(45) Date of Patent: Jan. 3, 2023

(54) DYNAMIC RECONFIGURATION OF VIRTUAL DEVICES FOR MIGRATION ACROSS DEVICE GENERATIONS

(71) Applicant: VMWARE, INC., Palo Alto, CA (US)

(72) Inventors: Radu Rugina, Palo Alto, CA (US); Vivek Mohan Thampi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 397 days.

(21) Appl. No.: 16/807,188

(22) Filed: Mar. 3, 2020

(65) Prior Publication Data

US 2021/0208920 A1 Jul. 8, 2021

(30) Foreign Application Priority Data

Jan. 7, 2020 (IN) .............................. 202041000662

(51) Int. Cl.
*G06F 9/455* (2018.01)
*G06F 13/20* (2006.01)
*G06F 13/42* (2006.01)

(52) U.S. Cl.
CPC .......... *G06F 9/45558* (2013.01); *G06F 13/20* (2013.01); *G06F 13/4282* (2013.01); *G06F 2009/4557* (2013.01); *G06F 2009/45579* (2013.01); *G06F 2213/0026* (2013.01)

(58) Field of Classification Search
CPC ......... G06F 9/45558; G06F 2009/4557; G06F 2009/45579
See application file for complete search history.

(56) References Cited

U.S. PATENT DOCUMENTS

| 8,146,082 | B2 | 3/2012 | Belay | |
| 9,197,489 | B1 * | 11/2015 | Vincent | H04L 67/148 |
| 9,928,107 | B1 * | 3/2018 | Vincent | G06F 9/5077 |
| 10,554,485 | B2 | 2/2020 | Wen et al. | |
| 10,860,363 | B1 * | 12/2020 | Gabrielson | G06F 9/45558 |
| 10,901,768 | B1 * | 1/2021 | Mandadi | H04L 41/0897 |
| 10,970,099 | B2 | 4/2021 | Jain et al. | |

(Continued)

OTHER PUBLICATIONS

Non-Final Office Action dated Jun. 14, 2022 in U.S. Appl. No. 16/817,653, 15 pages.

(Continued)

*Primary Examiner* — Benjamin C Wu
(74) *Attorney, Agent, or Firm* — Kim & Stewart LLP

(57) ABSTRACT

A method of migrating a virtual machine having a virtual device that is backed by direct passthrough hardware, from a source host to a destination host, includes the steps of determining whether or not the destination host has direct passthrough hardware that can back the virtual device, and upon determining that the destination host has direct passthrough hardware that can back the virtual device, determining if a version of the direct passthrough hardware at the source host matches a version of the direct passthrough hardware at the destination host. If the versions do not match, the steps further include quiescing the virtual device, deleting data structures relating to the virtual device, and then migrating the virtual machine from the source host to the destination host. If the versions match, the virtual machine is migrated without quiescing the virtual device and without deleting the data structures relating to the virtual device.

20 Claims, 11 Drawing Sheets

(56) References Cited

U.S. PATENT DOCUMENTS

| | | | |
|---|---|---|---|
| 2007/0271560 A1* | 11/2007 | Wahlert | G06F 8/61 |
| | | | 718/1 |
| 2008/0294808 A1 | 11/2008 | Mahalingam et al. | |
| 2009/0007105 A1* | 1/2009 | Fries | G06F 8/65 |
| | | | 718/1 |
| 2010/0211827 A1 | 8/2010 | Moyer et al. | |
| 2011/0179414 A1 | 7/2011 | Goggin et al. | |
| 2012/0254862 A1* | 10/2012 | Dong | G06F 9/4411 |
| | | | 718/1 |
| 2014/0229769 A1 | 8/2014 | Abraham et al. | |
| 2019/0108106 A1 | 4/2019 | Aggarwal et al. | |
| 2019/0243672 A1* | 8/2019 | Yadav | G06F 9/45558 |
| 2019/0361728 A1 | 11/2019 | Kumar et al. | |
| 2021/0064408 A1* | 3/2021 | Gill | G06F 9/485 |

OTHER PUBLICATIONS

VMWARE, Inc. "vSphere Networking," Product Documentation, 2016, pp. 86-96.
Notice of Allowance dated Oct. 19, 2022 in U.S. Appl. No. 16/817,653, 13 pages.

* cited by examiner

DYNAMIC RECONFIGURATION OF VIRTUAL DEVICES FOR MIGRATION ACROSS DEVICE GENERATIONS

RELATED APPLICATIONS

Benefit is claimed under 35 U.S.C. 119(a)-(d) to Foreign Application Serial No. 202041000662 filed in India entitled "DYNAMIC RECONFIGURATION OF VIRTUAL DEVICES FOR MIGRATION ACROSS DEVICE GENERATIONS", on Jan. 7, 2020, by VMware, Inc., which is herein incorporated in its entirety by reference for all purposes.

BACKGROUND

Virtualization of I/O devices poses challenges. Currently, software performs virtualization of an I/O device by interposing itself between a driver for the I/O device running in a guest operating system (OS) and the underlying hardware I/O device. When triggered by a guest memory access, the virtualization software parses I/O commands, translates the guest addresses into host physical addresses and ensures that referenced memory pages are present in memory. Additionally, the virtualization software serializes multiple I/O requests from all virtual machines into a single I/O stream to be handled by the underlying hardware, thereby sharing the underlying hardware among all of the virtual machines. However, CPU overhead is needed to implement the software virtualization of the I/O device, and such overhead reduces the throughput that the I/O device is capable of delivering.

An alternative to software virtualization is direct assignment. In direct assignment, the physical I/O device is controlled directly by a native driver in the guest OS. The result is a major improvement in performance because no software intervention is involved. However, direct assignment has a limitation in that the I/O device cannot be shared among virtual machines (VMs). The physical I/O device is assigned to only one VM.

Thus, I/O virtualization that allows sharing of I/O devices, as well as high performance of the I/O devices, is needed.

Single root I/O virtualization (SR-IOV) is an attempt to answer this need. SR-IOV provides two new functions types, physical functions, and virtual functions. Physical functions (PFs) manage the entire SR-IOV device. Virtual functions (VFs) are numerous lightweight versions of the SR-IOV device sufficient to support several VMs, thereby allowing sharing of the physical I/O device among VMs and direct access to the virtual functions by the VMs.

However, while SR-IOV devices solve the problem of sharing and high performance by allowing VMs, through guest VF drivers installed therein, to have direct access to sharable virtual functions, another difficulty emerges. Virtual devices backed by direct access to SR-IOV devices means that the virtual devices are bound to the specific capabilities and supported protocols of the SR-IOV device. Once a guest device driver for the virtual device is initialized, the hardware configuration is assumed to stay constant until the guest device driver is reloaded manually or the operating system is rebooted. In addition, if a VM containing the guest device driver is migrated to a different host, the guest driver expects the hardware configuration on the different host to be exactly the same. Differences in SR-IOV devices can arise for a variety of reasons such as firmware that is changed to support slightly different capabilities. Such slightly different capabilities may include small semantic changes to device operations, minor variations in input and output semantics of algorithms, or even addition or removal of algorithms. These minor differences can render the hardware incompatible with the guest device driver.

SUMMARY

One or more embodiments provide a method of migrating a virtual machine having a virtual device that is backed by direct passthrough hardware, from a source host to a destination host, includes the steps of determining whether or not the destination host has direct passthrough hardware that can back the virtual device, and upon determining that the destination host has direct passthrough hardware that can back the virtual device, determining if a version of the direct passthrough hardware at the source host matches a version of the direct passthrough hardware at the destination host. If the versions do not match, the steps further include quiescing the virtual device, deleting data structures relating to the virtual device, and then migrating the virtual machine from the source host to the destination host. If the versions match, the virtual machine is migrated without quiescing the virtual device and without deleting the data structures relating to the virtual device.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

Disclosed herein are techniques to reinitialize a device driver for a virtual device that is backed by direct passthrough hardware so that a virtual machine, which has the virtual device installed therein, can be migrated to a destination host even though the destination host may not have direct passthrough hardware that is identical to the one at the source host. According to the techniques disclosed herein, the device driver at the source host performs a graceful quiescence of the virtual device and sends a message that the quiescence is completed. The completion message is a trigger for the virtual machine to be migrated. Upon completion of the migration, the device driver is reinitialized at the destination host, and the device driver reconfigures the virtual device at the destination host in view of the capabilities of the direct passthrough hardware at the destination host.

Figure 1A:
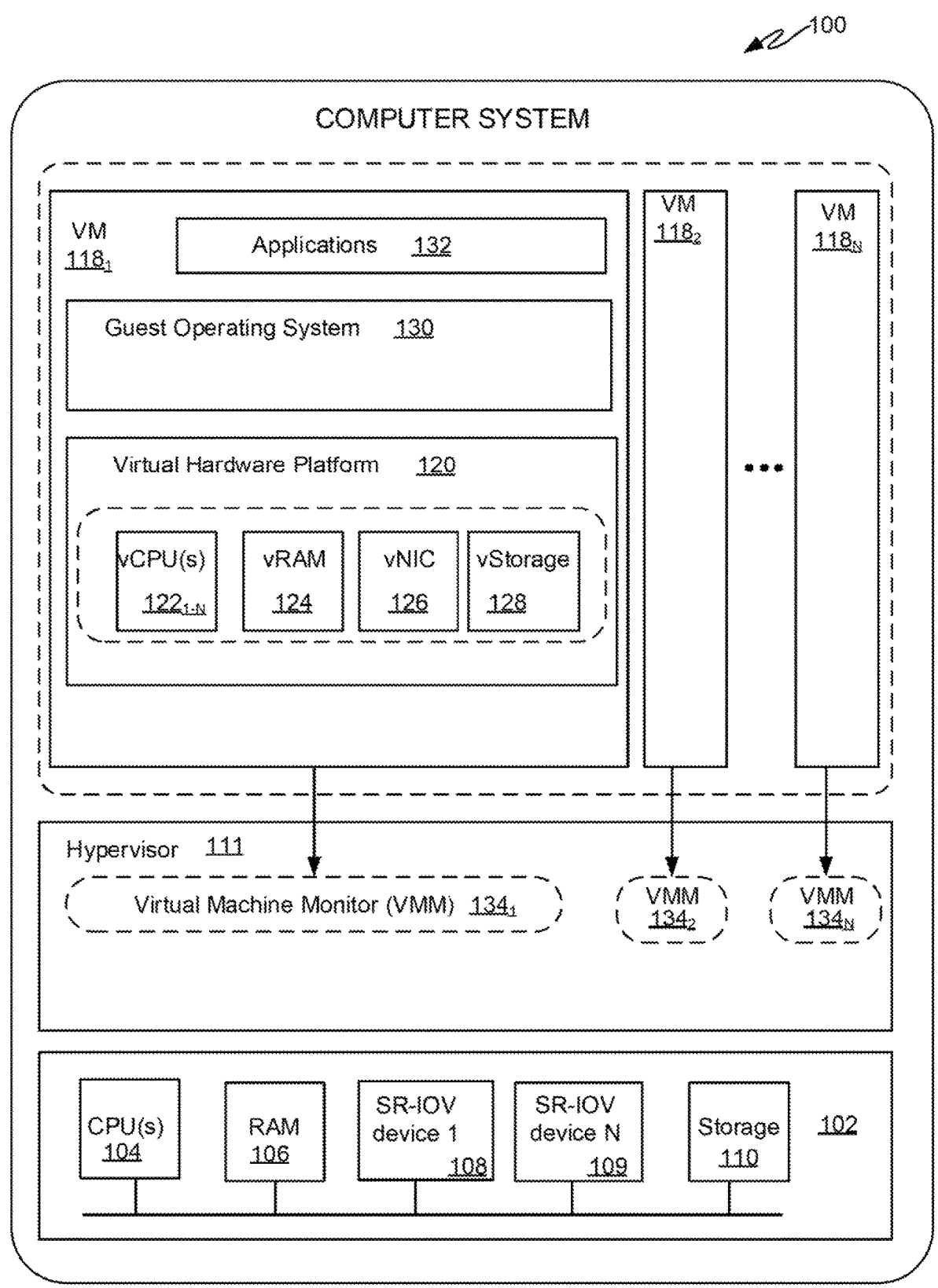
FIG. 1A depicts a block diagram of a computer system that is representative of a virtualized computer architecture in which embodiments may be implemented.

FIG. 1A depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, a random access memory (RAM) 106, one or more single-root I/O virtualization (SR-IOV) devices 108, 109 and persistent storage 110. In one embodiment, one of the SR-IOV devices 108, 109 is a physical network interface controller (pNIC) and another one of the SR-IOV devices 108, 109 is a co-processor that accelerates and compresses cryptographic workloads, e.g., Intel® QAT (Quick Assist Technology).

A virtualization software layer, referred to hereinafter as hypervisor 111, is installed on top of hardware platform 102. Hypervisor 111 makes possible the concurrent instantiation and execution of one or more virtual machines (VMs) $118_1$-$118_N$. The interaction of a VM $118_{1-N}$ with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM $134_1$-$134_N$ includes the hardware emulation components for the virtual machine. In such an alternative conception, for example, the conceptual layer described as virtual hardware platform 120 may be merged with and into VMM $134_1$-$134_N$.

Figure 1B:
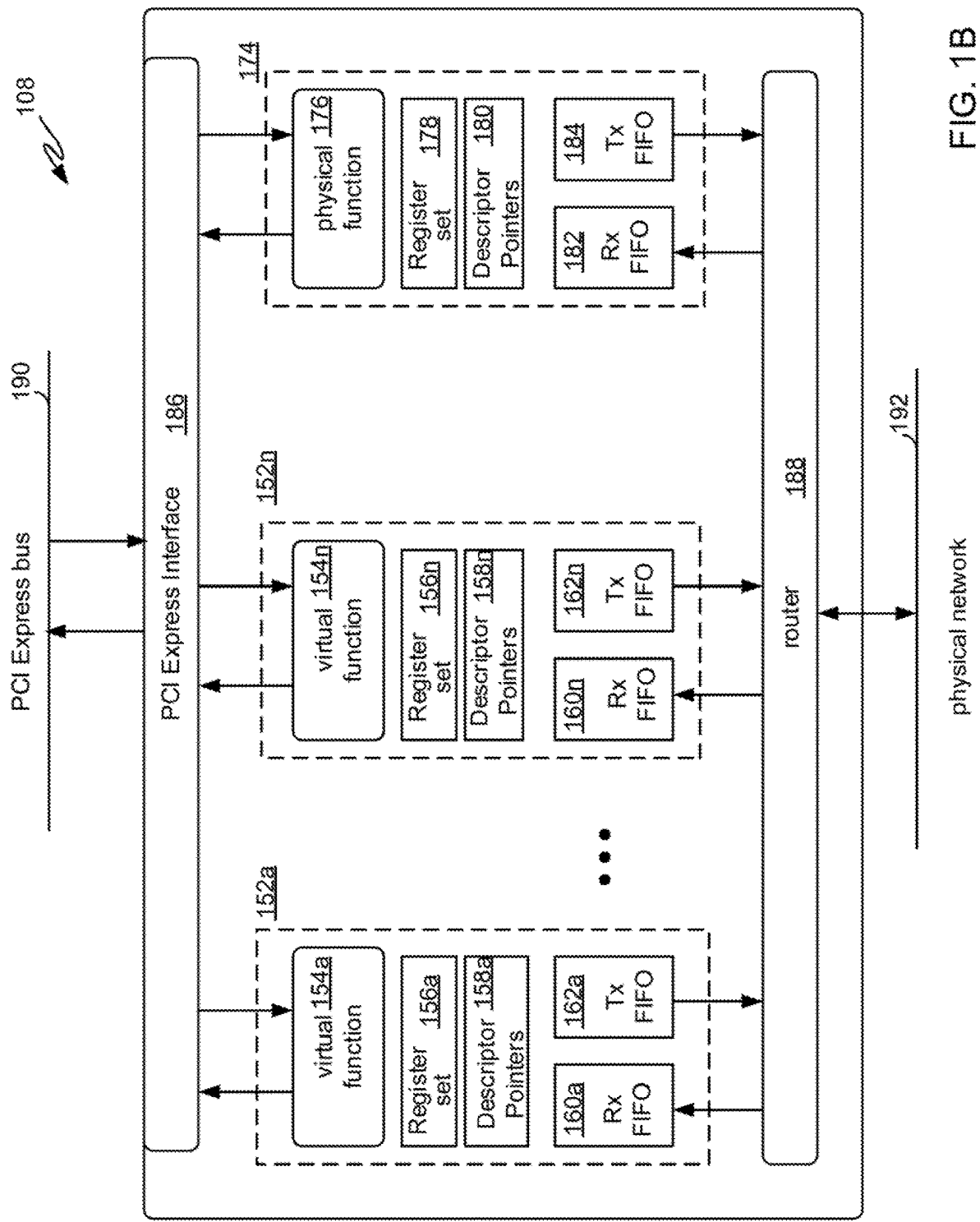
FIG. 1B depicts an example SR-IOV device.

FIG. 1B depicts an example of an SR-IOV device such as SR-IOV device 108. In the figure, SR-IOV device 108 is a physical network interface controller (pNIC), which is used to back vNICs 126 in VMs $118_1$-$118_N$. Included in SR-IOV device 108 are a number of virtual function (VF) devices 152a-n and a physical function (PF) device 174. Each of the VF devices 152a-n and PF device 174 are connected to a PCI Express (PCIe) bus interface 186 that is connected to a PCIe bus 190 of computer system 100 and to a router 188 that is connected to a physical network 192, such as an Ethernet cable.

Physical function (PF) 176 of PF device 174 is a portion of SR-IOV device 108 that has full PCIe functions and includes a register set 178, a set of descriptor pointers 180, a receive FIFO 182, and a transmit FIFO 184. Register set 178 include base address registers (BARs) that divide the memory space of PF 176 into a number of memory areas, a mailbox register, and a doorbell register. The set of descriptor pointers 180 points to descriptors that configure the transfers performable by PF device 174. Receive FIFO 182 and transmit FIFO 184 buffer the data in transit between physical network 192 and RAM 106 that is connected to PCIe bus 190.

Each virtual function (VF) 154a-n implements lightweight PCIe functions that include the resources necessary for data movement and a minimized set of configuration resources. Each VF 154a-n has its register set 156a-n, which includes a set of BARs, a mailbox register, and a doorbell register, a set of descriptor pointers 158a-n, receive FIFO 160a-n, and transmit FIFO 162a-n. One or more VF devices 152a-n are associated with one of VMs $118_1$-$118_N$.

To receive an incoming packet, the pNIC device (which is SR-IOV device 108) operates as follows. Upon arrival of a network packet, the packet is sent to router 188 which routes the packet to a receive FIFO 160a-n of one of VF devices 152a-n, and then the pNIC device initiates a DMA operation between FIFO 160a-n and RAM 106 of computer system 100, the target memory address for the DMA operation having been defined by one or more descriptor pointers in VF device 152a-n. When the DMA transfer is complete, the packet resides in RAM 106 of computer system 100 after which the pNIC device generates an interrupt to one of the CPUs 104 of computer system 100 indicating that the packet has arrived.

To transmit a packet, the pNIC device fetches one or more descriptor pointers describing the transaction from RAM 106 of computer system 100, and then the pNIC device fetches the packet data from RAM 106 at a target address specified by one of the descriptor pointers 158a-n and loads the packet data into transmit FIFO 162a-n of one of VF devices 152a-n. Then, the pNIC device transfers the packet data to physical network 192. After the transfer is completed, the pNIC device generates an interrupt to one of the CPUs 104 of computer system 100.

As mentioned above, another example of SR-IOV device 108 is a co-processor that performs hardware acceleration of cryptographic workloads for the CPU. Hardware acceleration of such workloads may include acceleration of (a) industry-standard security algorithms, such as VPN (virtual private network), SSL/TLS (secure socket/transport layer security), IPSec (Internet protocol security) and firewall applications, (b) symmetric cryptography (AES (advanced encryption standard), DES (data encryption standard), MD5 (message digest algorithm)), (c) public key cryptography (RSA key generation), and (d) compression and decompression. Each type of hardware acceleration is available as a physical function, and virtual functions corresponding to one or more of these accelerations are available for direct assignment by a virtual driver. In such a hardware acceleration device, it often occurs that the algorithms may be added to the existing ones and supported algorithms may be altered for improved performance.

Figure 2A:
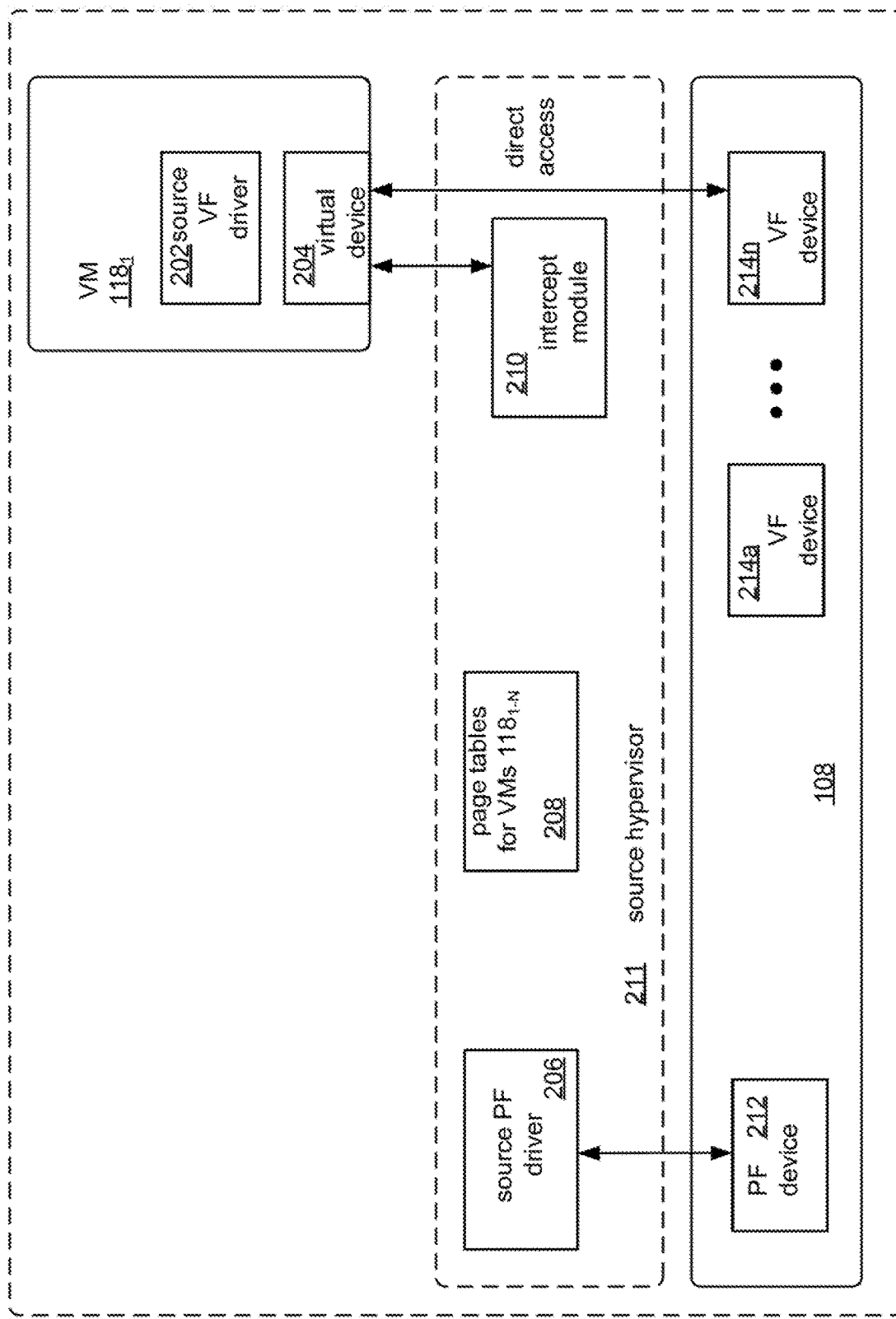
FIG. 2A depicts a view of drivers for the SR-IOV device and a virtual machine running on a source computer system.

FIG. 2A depicts a view of drivers for the SR-IOV device and a VM running on a source computer system 200, which is an instance of computer system 100. The figure includes an SR-IOV device 108, which has a PF device 212 and a number of VF devices 214a-n, which are direct passthrough devices in that they can be directly accessed by VM $118_1$. The figure further includes a source PF driver 206 (also called a master driver (MD)), residing in source hypervisor 211, page tables 208 for VMs $118_1$-$118_N$, and an intercept module 210 also residing in source hypervisor 211. Also depicted is a VM $118_1$ that includes a source VF driver 202 residing in a guest OS 130 running in VM $118_1$, and a virtual device 204. As shown, source VF driver 202 is associated with one of the VF devices 214, e.g., VF device 214n, which backs virtual device 204.

Source PF driver 206 is a host driver that manages the global functions of SR-IOV device 108 and is responsible for configuring shared resources of SR-IOV device 108. PF driver 206 contains all of the traditional driver functionality to provide access to the I/O resources of SR-IOV device 108 for hypervisor 111. Source PF driver 206 can also be called upon to perform operations that impact the entire SR-IOV device 108.

Page tables 208 are either (a) page tables mapping virtual addresses of guest OS 130 to a guest physical space along with extended page tables mapping the guest physical space to physical RAM 106 of source computer system 200 or (b) shadow page tables that map virtual addresses of guest OS 130 to physical RAM 106 of source computer system 200.

Intercept module 210 operates intercept communications between source VF driver 202 and VF devices 214a-214n in SR-IOV device 108.

Source VF driver 202 is a driver that realizes only certain functionality available to it, such as being able to configure the descriptor pointers in VF device 214n by having direct access to VF device 214n. Source VF driver 202 and source PF driver 206 exchange messages with each other, the messages including request-response messages (e.g., driver compatibility requests or device capability requests issued by source VF driver 202 and answered by source PF driver 206) and PF notification messages (e.g., device error notification messages that source PF driver 206 issues for source VF driver 202, or init/shutdown notifications from source VF driver 202 to source PF driver 206).

Figure 2B:
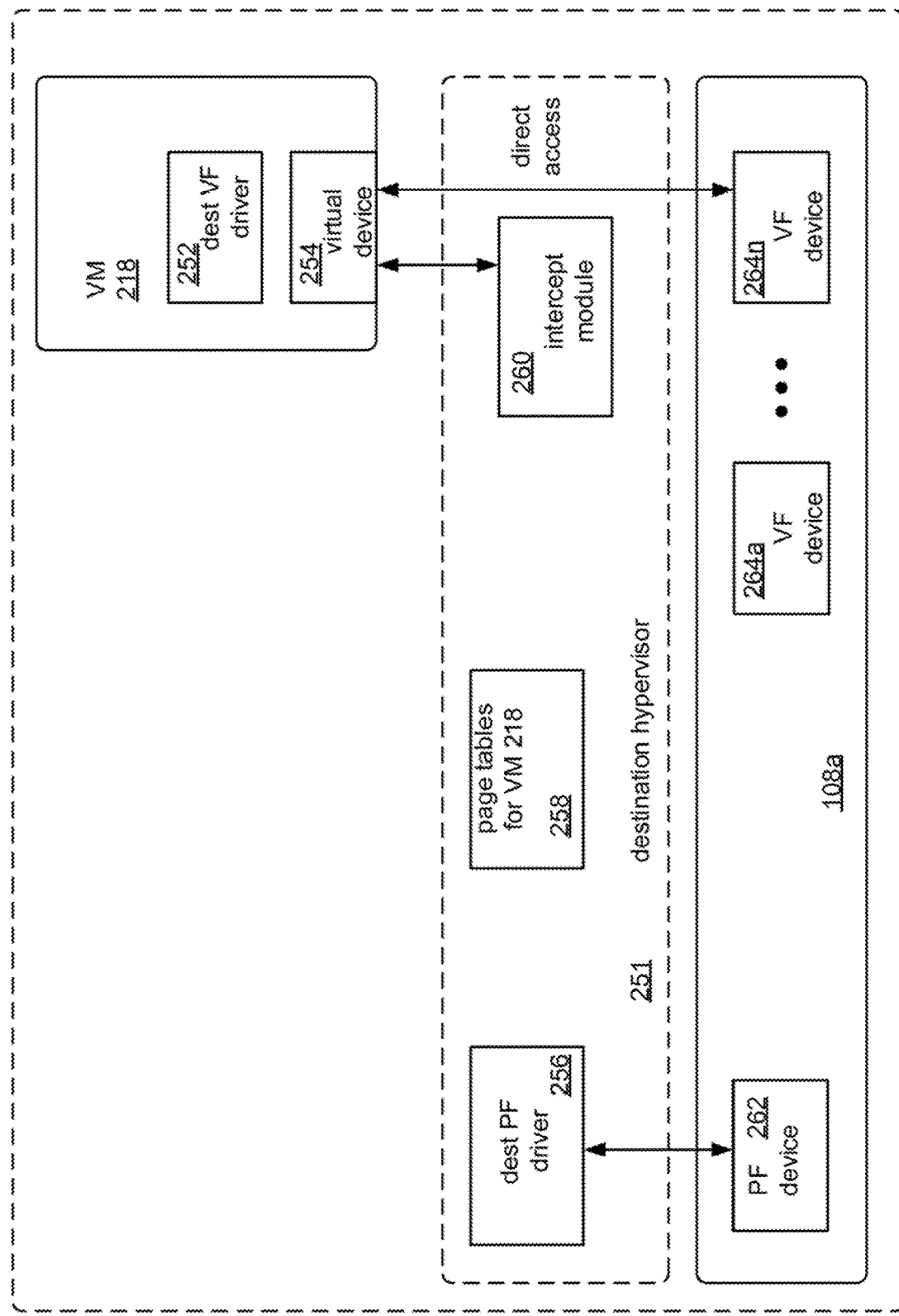
FIG. 2B depicts a view of drivers for the SR-IOV device and a virtual machine running on a destination computer system.

FIG. 2B depicts a view of drivers for the SR-IOV device and a VM 218 running on a destination computer system 250, which is an instance of computer system 100. The figure includes an SR-IOV device 108a, which has a PF device 262 and a number of VF devices 264a-n. The figure further includes a destination PF driver 256, page tables 258 for VM 218, and an intercept module 260 residing in destination hypervisor 251. Also depicted is VM 218 that includes a destination VF driver 252 residing in a guest OS 130 running in VM 218, and a virtual device 254. As shown, destination VF driver 252 is associated with one of the VF devices 264n which backs virtual device 254.

Figure 3A:
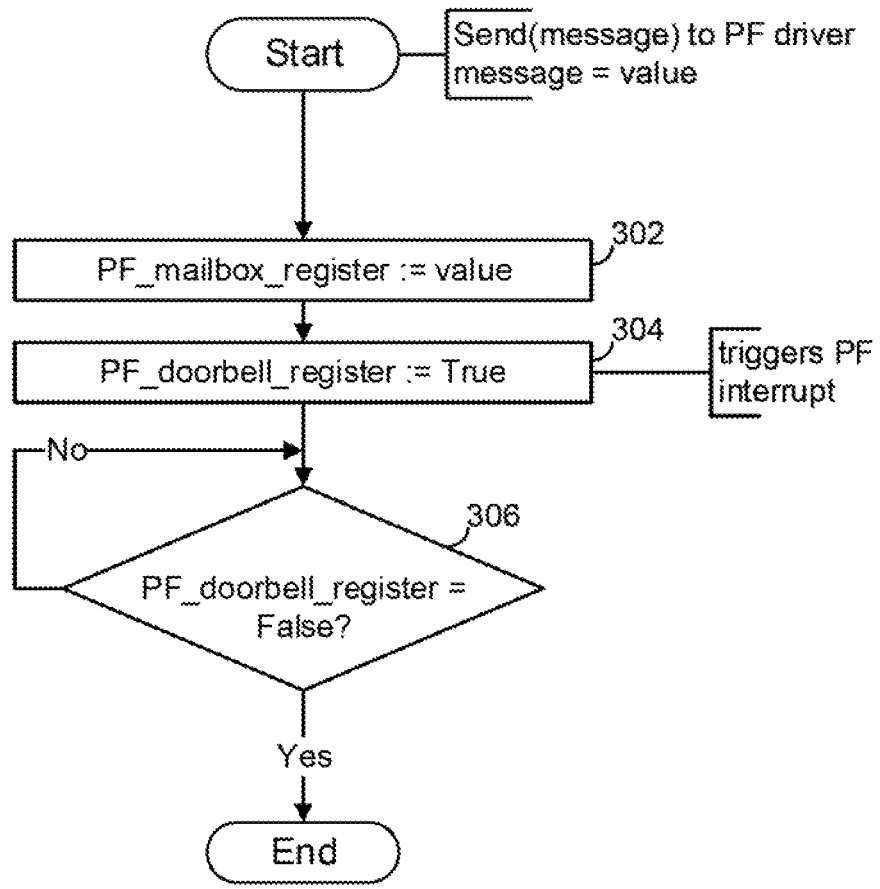
FIGS. 3A and 3B depict flow charts of basic send and receive functions used for communication to the PF driver, in an embodiment.

Referring to FIG. 3A, to send a message to PF driver 206, a Send (message) function is invoked by a sender, such as VF driver 202. In step 302, the function stores the message as a value in the PF_mailbox_register, which is the mailbox register of register set 178. After the message is stored, the function sets to True the PF_doorbell_register, which is the doorbell register in register set 178, in step 304 to cause an interrupt to PF driver 206. In step 306, the function waits for the PF_doorbell_register to be set to False, which indicates that the message was received. Though the Send function is described using registers, other types of communication involving FIFOs or ring buffers can be employed.

Figure 3B:
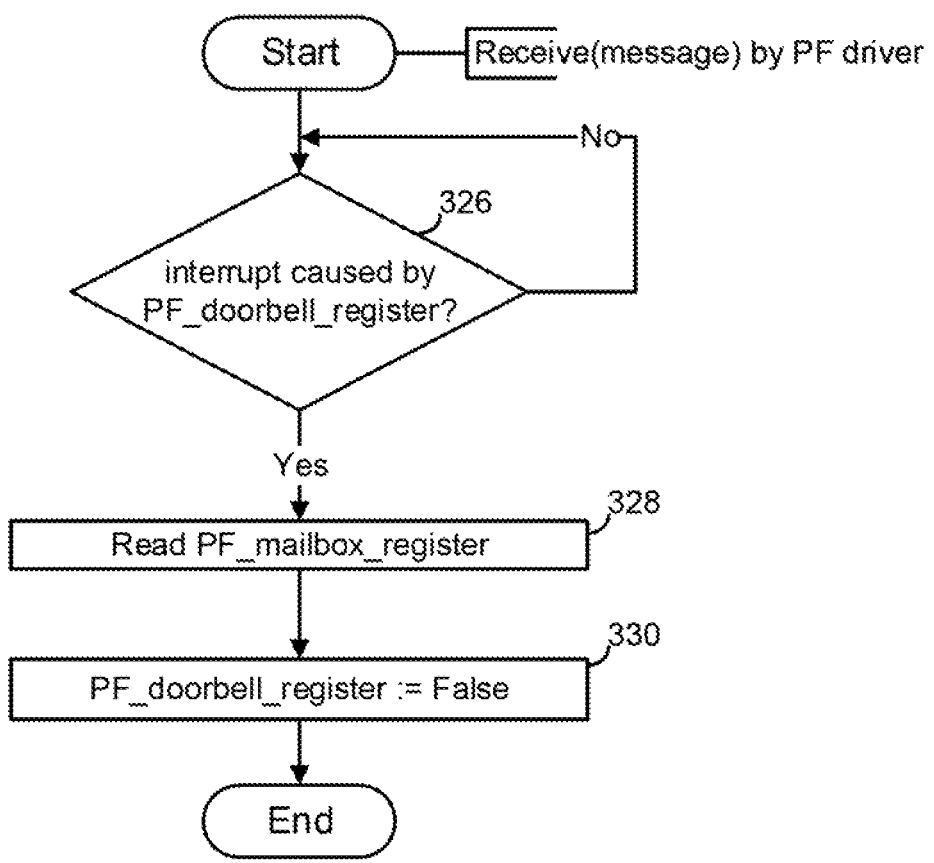

Referring to FIG. 3B, PF driver 206 receives a message according to the Receive (message) function. Upon receiving the interrupt caused by a sender setting the PF_doorbell_register to True in step 326, PF driver 206 reads the PF_mailbox_register in step 328 and in step 330 sets the PF_doorbell_register to False to acknowledge receipt of the message.

Figure 3C:
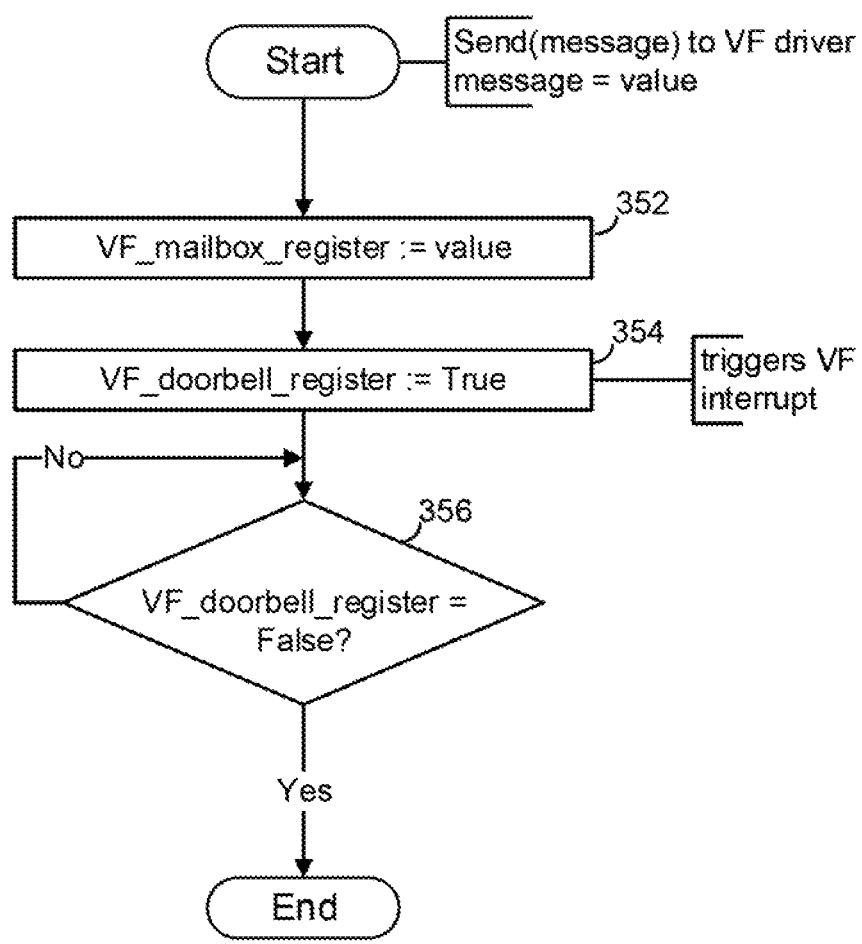
FIGS. 3C and 3D depict flow charts of basic send and receive functions used for communication to the VF driver, in an embodiment.

Referring to FIG. 3C, to send a message to VF driver 202, the Send (message) function is invoked by PF driver 206. In step 352, the function stores the message as a value in the VF_mailbox_register, which is the mailbox register of one of register sets 156a-n. After the message is stored, the function sets to True the VF_doorbell_register, which is the doorbell register of one of register sets 156a-n, in step 354. In step 356, the function waits for the VF_doorbell_register to be set to False, which indicates that the message was received.

Figure 3D:
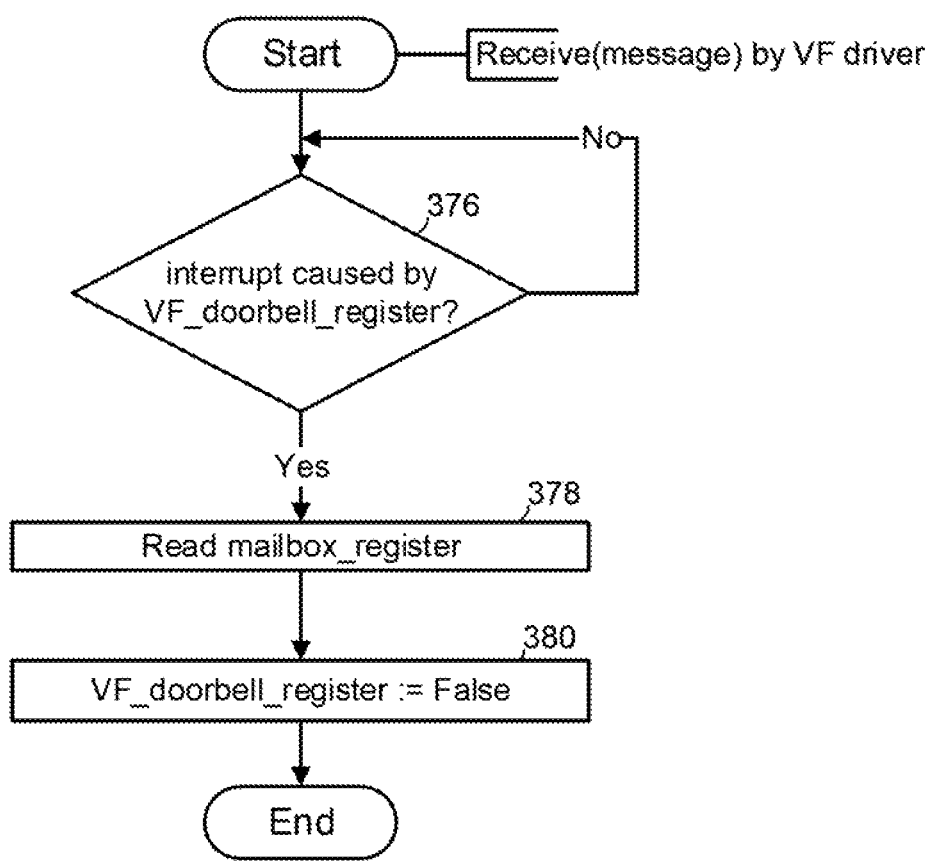

Referring to FIG. 3D, the VF driver 202 receives a message according to the Receive (message) function. Upon receiving the interrupt caused by a sender setting the VF_doorbell_register to True in step 376, VF driver 202 reads the message from the VF_mailbox_register in step 378. In step 380, the function sets the VF_doorbell_register to False to acknowledge receipt of the message.

When the Send and Receive functions use memory-mapped mailbox registers for communication, accesses to those mailbox registers in those functions cause guest memory access intercepts, where a guest memory access intercept is a page permission violation that causes an exit to the hypervisor or a hypervisor page fault. These guest memory access intercepts incur a large overhead. In addition, when many of the memory-mapped mailbox registers reside in the same memory page as other registers used for operating or monitoring the SR-IOV device, then additional guest memory access intercepts are incurred for accesses to registers that may be performance-critical. Incurring guest memory access intercepts when these other registers are accessed leads to increased latency for critical device functions. In the embodiment where SR-IOV device 108 is a co-processor that accelerates and compresses cryptographic workloads, performance-critical registers include registers used to submit the workloads and monitor progress of the submitted workloads.

Figure 4A:
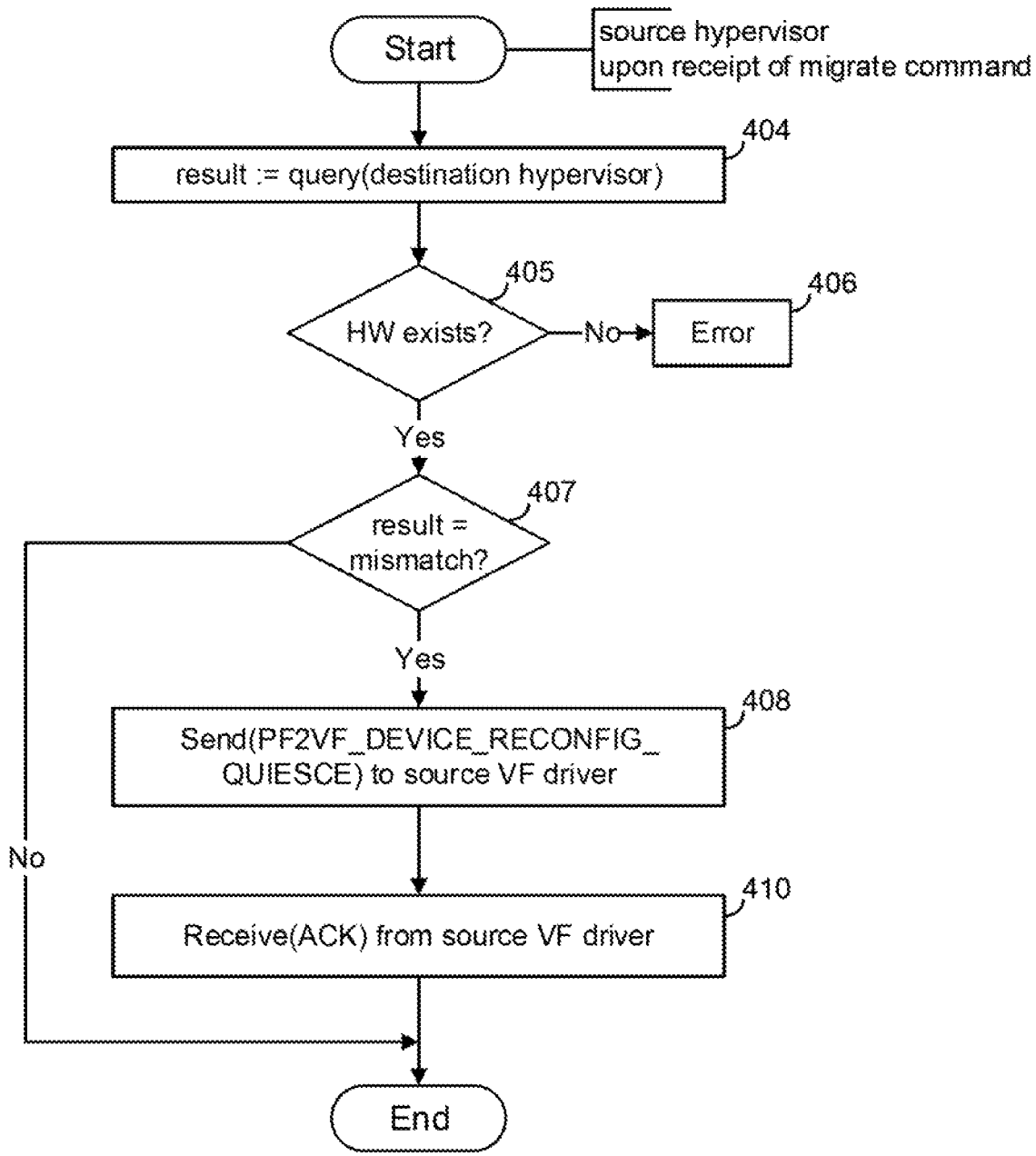
FIGS. 4A-4C depict a flow of operations for reconfiguring a virtual device before the migration of a VM.
Figure 4B:
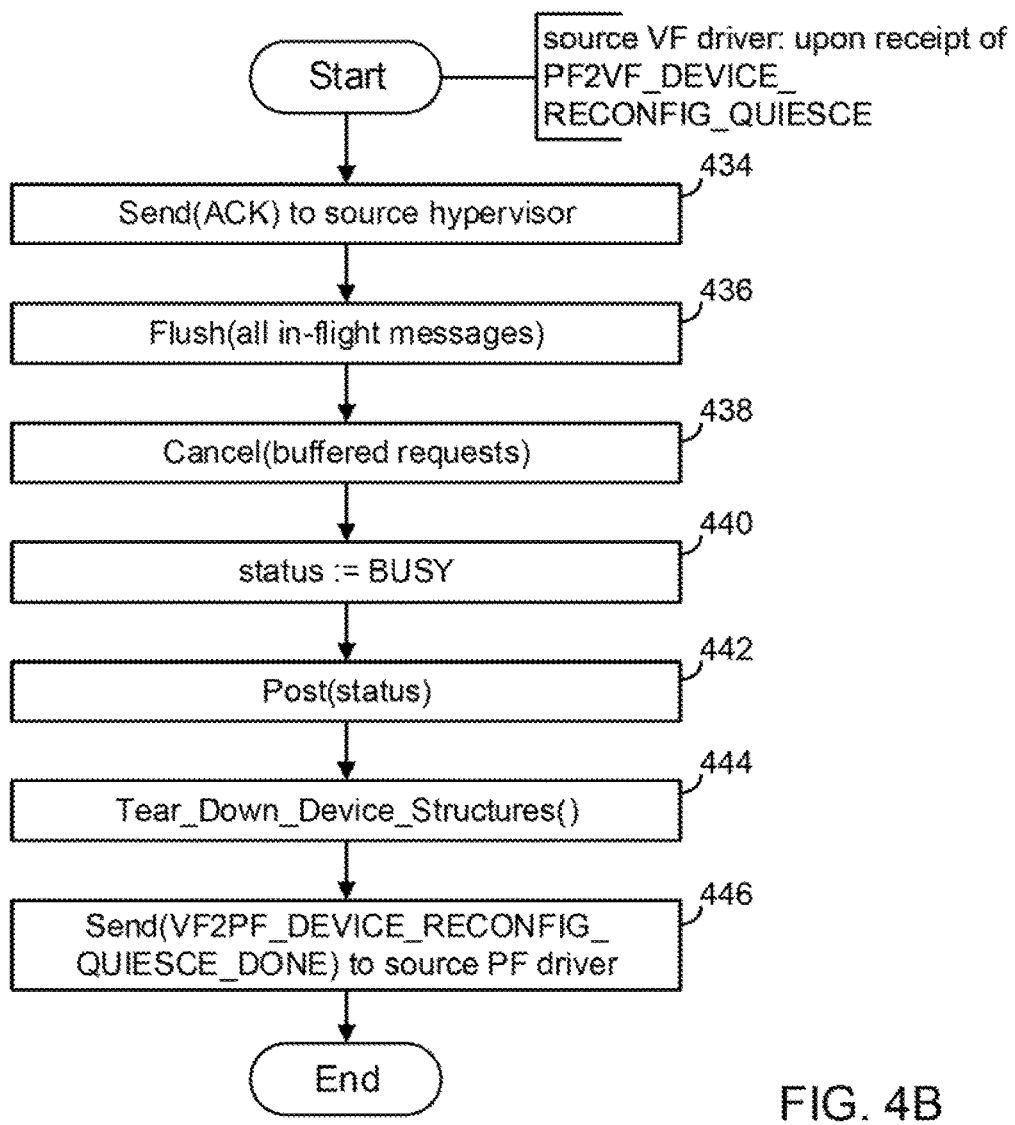
Figure 4C:
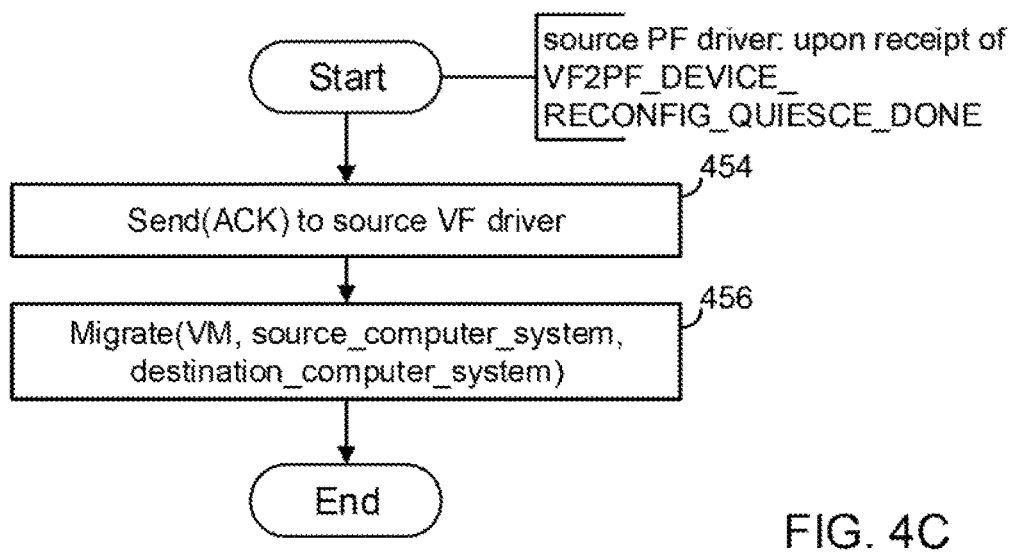

FIGS. 4A-4C depict a flow of operations for quiescing a virtual device that is backed by direct passthrough hardware, e.g., SR-IOV device 108, before the migration of a VM.

The method depicted in FIG. 4A is executed by source hypervisor 211 upon receipt of a command to migrate a VM (in this example, VM $118_1$) from source computer system 200 to destination computer system 250. In one embodiment, source hypervisor 211 receives the command to migrate the VM from a VM management server. If so, then in step 404, source hypervisor 211 queries destination hypervisor 251 if there is direct passthrough hardware that is capable of backing virtual device 204 in destination computer system 250 after migration and if so the version information for such hardware. In the example illustrated herein, it is assumed that SR-IOV device 108a is the direct passthrough hardware that is capable of backing virtual device 204 in destination computer system 250. If, however, the result of the query indicates that there is no such direct passthrough hardware (step 405, No), an error is returned in step 406. On the other hand, if the direct passthrough hardware exists in destination computer system 250 (step 405, Yes), source hypervisor 211 determines if there is a mismatch of versions of the direct passthrough hardware in source computer system 200 and the direct passthrough hardware in destination computer system 250 (step 407). Such a mismatch is based on computing differences between the source and destination direct passthrough hardware and determining if reconfiguration for those devices is supported. In one embodiment, computing the differences is a function in the PF drivers in the source and destination computer systems and the hypervisor queries the source and destination PF drivers to determine reconfigurability before any migration. If there is a mismatch (step 407, Yes), source hypervisor 211 in step 408 sends a PF2VF_DEVICE_RECONFIG_QUIESCE message to source VF driver 202. When source hypervisor 211 receives in step 410 an acknowledgement of receipt of the message from source VF driver 202, the method depicted in FIG. 4A ends. The PF2VF_DEVICE_RECONFIG_QUIESCE message instructs source VF driver 202 to stop all outstanding activity between source VF driver 202 and VF device 214*n* so that the migration of VM 118$_1$ in which source VF driver 202 resides does not cause loss of data between source VF driver 202 and VF device 214*n*. On the other hand, if a match in the versions is determined in step 406, the method depicted in FIG. 4A ends without any quiescence of virtual device 204.

The actions of source VF driver 202 in response to the PF2VF_DEVICE_RECONFIG_QUIESCE message from source hypervisor 211 are depicted in FIG. 4B. In step 434, source VF driver 202 sends an acknowledgment, ACK, to source hypervisor 211. Then, source VF driver 202 flushes or rejects all in-flight messages not yet acknowledged by the direct passthrough hardware in step 436 and cancels all buffered requests not yet submitted to the direct passthrough hardware in step 438. Cancellation of the buffered requests is notified to clients and applications using error codes. In addition, source VF driver 202 sets its status to 'BUSY' in step 440 and posts its status in step 442. As a result of posting this 'BUSY' status, any new requests for operations by the direct passthrough hardware are not accepted. In step 444, source VF driver 202 tears down (i.e., deletes) all of the virtual device-related data structures. After completing step 444, source VF driver 202 sends a VF2PF_DEVICE_RECONFIG_QUIESCE_DONE message to source PF driver 206 (step 446), reflecting that the state of the virtual device is now in a "base state" in which no new requests are accepted, but is not shut down).

The actions of source PF driver 206 in response to the VF2PF_DEVICE_RECONFIG_QUIESCE_DONE message from source VF driver 202 are depicted in FIG. 4C. In step 454, source PF driver 206 sends an acknowledgment to source VF driver 202. Then, in step 456, source PF driver 206 calls a Migrate (VM, source_computer_system, destination_computer_system) function, in response to which source hypervisor 211 and destination hypervisor 251 carry out the process of migrating VM 118$_1$ from source computer system 200 to destination computer system 250.

Figure 5A:
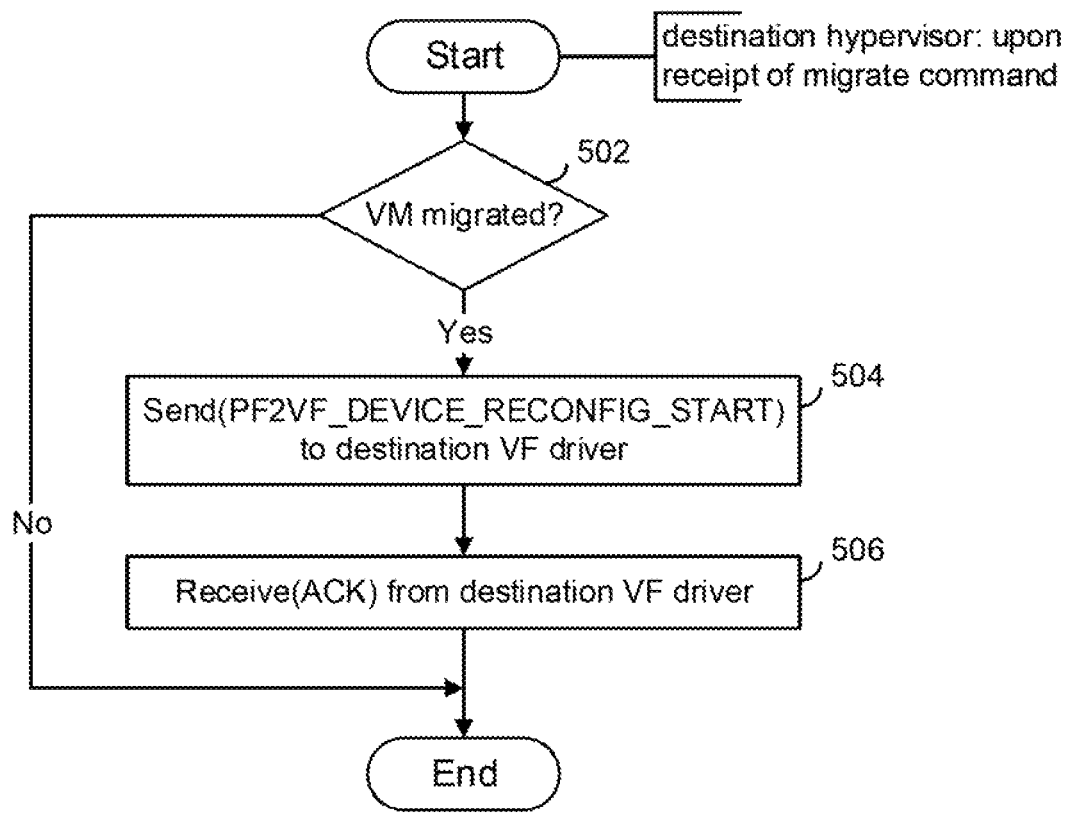
FIGS. 5A-5B depict a flow of operations at a destination computer system, after the migration of the VM.
Figure 5B:
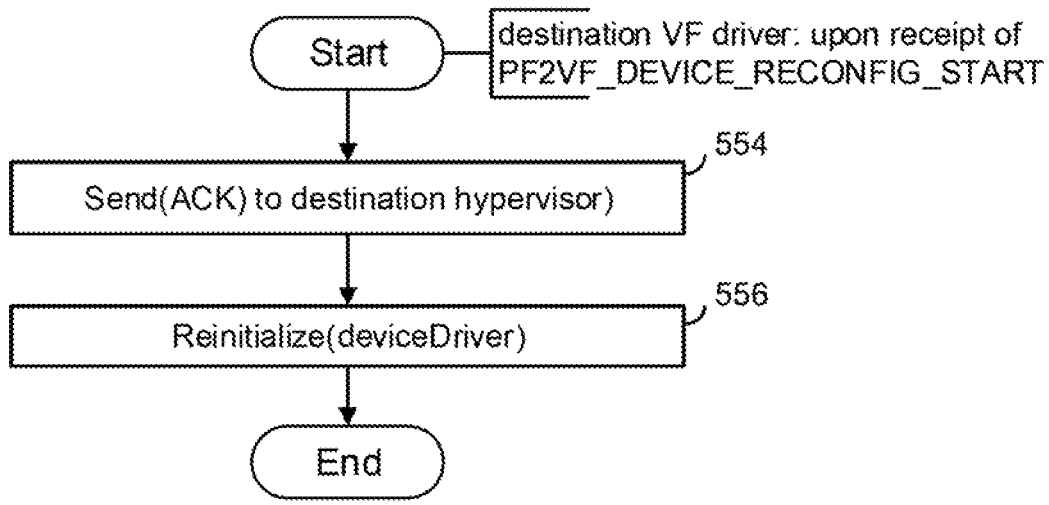

FIGS. 5A-5B depict a flow of operations at destination computer system 250, after the migration of the VM.

Referring to FIG. 5A, in step 502, destination hypervisor 251 determines whether migration of VM 118$_1$ has completed. If so, in step 504, destination hypervisor 251 sends a PF2VF_DEVICE_RECONFIG_START message to destination VF driver 252. When destination hypervisor 251 receives in step 506 an acknowledgement of receipt of the message from destination VF driver 252, the method depicted in FIG. 5A ends.

The actions of destination VF driver 252 in response to the PF2VF_DEVICE_RECONFIG_START message from destination hypervisor 251 are depicted in FIG. 5B. In step 554, destination VF driver 252 sends an acknowledgment to destination hypervisor 251. Then, in step 556, destination VF driver 252 reinitializes itself while informing applications using the device that the driver may stop accepting certain types of requests. For example, if only minor changes are made to the MMIO (memory-mapped input/output) register semantics, which only affects the driver internally, or the destination device, such as hardware accelerator, adds new algorithms, then applications may not be affected. However, if the destination device removes algorithms, then the application is affected and may resort to registering a failure or invoking a fallback operation (such as a software-implemented function) that is slower. In step 556, destination VF driver 252 also reconfigures virtual device 254, which is now backed by the direct passthrough device at destination computer system 250, e.g., SR-IOV device 108*a*, in particular VF device 264*n*. During reconfiguration of virtual device 254, destination VF driver 252 re-reads the supported algorithms or inputs and restores all of the virtual device-related data structures that were torn down prior to migration. After step 556, destination VF driver 252 resumes accepting new client requests.

As used herein, "direct passthrough hardware" refers to hardware that is directly assigned to a virtual machine and directly accessible by the virtual machine, without the involvement of the hypervisor. MMIO instructions that access such hardware do not cause hypervisor exits to the VMM, and run directly on hardware. Examples of direct passthrough hardware are SR-IOV network interface controllers, SR-IOV co-processors, such as Intel® QAT, and any PCI device if MMIO instructions that access the PCI device do not cause hypervisor exits to the VMM and run directly on the PCI device.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of migrating a virtual machine having a virtual device that is backed by direct passthrough hardware, from a source host to a destination host, the method comprising:
   determining whether or not the destination host has direct passthrough hardware that can back the virtual device;
   upon determining that the destination host has direct passthrough hardware that can back the virtual device, determining if a version of the direct passthrough hardware at the source host matches a version of the direct passthrough hardware at the destination host;
   if the versions do not match, quiescing the virtual device, deleting data structures relating to the virtual device, and then migrating the virtual machine from the source host to the destination host; and
   if the versions match, migrating the virtual machine from the source host to the destination host, without quiescing the virtual device and without deleting the data structures relating to the virtual device.

2. The method of claim 1, wherein after migrating the virtual machine from the source host to the destination host, the virtual device is reconfigured at the destination host.

3. The method of claim 2, wherein the reconfiguration of the virtual device at the destination host causes data structures relating to the virtual device to be restored.

4. The method of claim 1, wherein said quiescing the virtual device includes deleting all in-flight messages and all stored requests for new operations.

5. The method of claim 4, wherein said quiescing the virtual device further includes posting a busy status for the virtual device.

6. The method of claim 5, wherein new requests for operations by the virtual device are not accepted as a result of the busy status of the virtual device.

7. The method of claim 1, further comprising:
   querying the destination host for information about hardware that can support the virtual device.

8. The method of claim 7, wherein the information about hardware includes hardware type and hardware version.

9. A non-transitory computer-readable medium comprising instructions executable in a computer system, wherein the instructions when executed in the computer system cause the computer system to carry out a method of migrating a virtual machine having a virtual device that is backed by direct passthrough hardware, from a source host to a destination host, said method comprising:
   determining whether or not the destination host has direct passthrough hardware that can back the virtual device;
   upon determining that the destination host has direct passthrough hardware that can back the virtual device, determining if a version of the direct passthrough hardware at the source host matches a version of the direct passthrough hardware at the destination host;
   if the versions do not match, quiescing the virtual device, deleting data structures relating to the virtual device, and then migrating the virtual machine from the source host to the destination host; and
   if the versions match, migrating the virtual machine from the source host to the destination host, without quiescing the virtual device and without deleting the data structures relating to the virtual device.

10. The non-transitory computer-readable medium of claim 9, wherein after migrating the virtual machine from the source host to the destination host, the virtual device is reconfigured at the destination host.

11. The non-transitory computer-readable medium of claim 10, wherein the reconfiguration of the virtual device at the destination host causes data structures relating to the virtual device to be restored.

12. The non-transitory computer-readable medium of claim 9, wherein said quiescing the virtual device includes deleting all in-flight messages and all stored requests for new operations.

13. The non-transitory computer-readable medium of claim 12, wherein said quiescing the virtual device further includes posting a busy status for the virtual device.

14. The non-transitory computer-readable medium of claim 13, wherein new requests for operations by the virtual device are not accepted as a result of the busy status of the virtual device.

15. The non-transitory computer-readable medium of claim 9, wherein the method further comprises:
   querying the destination host for information about hardware that can support the virtual device.

16. The non-transitory computer-readable medium of claim 15, wherein the information about hardware includes hardware type and hardware version.

17. A computer system comprising:

a plurality of processors;

a source direct passthrough hardware; and a memory device storing instructions that are executed by the processors to provision a hypervisor that supports an execution space for virtual machines and to instantiate a virtual machine that runs in the execution space, wherein the instructions when executed cause the processors to carry out a method of migrating the virtual machine having a virtual device that is backed by the source direct passthrough hardware to a destination host, said method comprising:

determining whether or not the destination host has a destination direct passthrough hardware that can back the virtual device;

upon determining that the destination host has the destination direct passthrough hardware that can back the virtual device, determining if a version of the source direct passthrough hardware matches a version of the destination direct passthrough hardware;

if the versions do not match, quiescing the virtual device, deleting data structures relating to the virtual device, and then migrating the virtual machine to the destination host; and if the versions match, migrating the virtual machine to the destination host, without quiescing the virtual device and without deleting the data structures relating to the virtual device.

18. The computer system of claim 17, wherein said quiescing the virtual device includes deleting all in-flight messages and all stored requests for new operations.

19. The computer system of claim 18, wherein said quiescing the virtual device further includes posting a busy status for the virtual device, so that new requests for operations by the virtual device are not accepted.

20. The computer system of claim 17, wherein the method further comprises:

querying the destination host for information about hardware that can support the virtual device, the information about hardware including hardware type and hardware version.

* * * * *